United States Patent

Fling et al.

[15] 3,638,492
[45] Feb. 1, 1972

[54] LIQUID LEVEL MEASURING DEVICE

[72] Inventors: Thomas A. Fling, 524 Post St., San Francisco, Calif. 94102; William F. Fling, 351 South Fuller St., Los Angeles, Calif. 90036

[22] Filed: May 7, 1970

[21] Appl. No.: 35,333

[52] U.S. Cl. ................................................73/315, 73/314
[51] Int. Cl. .........................................................G01f 23/06
[58] Field of Search ................73/314, 315; 33/126.5, 126.7

[56] References Cited

UNITED STATES PATENTS

| 1,020,171 | 3/1912 | Woodward | 73/315 |
| 2,340,616 | 2/1944 | Savko, Jr. | 73/315 |
| 1,653,759 | 12/1927 | Caretta | 73/314 |
| 1,913,023 | 6/1933 | Farrell | 73/315 |

FOREIGN PATENTS OR APPLICATIONS

| 25,753 | 1913 | Great Britain | 73/314 |

*Primary Examiner*—S. Clement Swisher
*Assistant Examiner*—Daniel M. Yasich
*Attorney*—Robert Charles Hill

[57] ABSTRACT

A liquid level measuring device is provided with a frame and a float member in near association with a guide. A gripper member is mounted on the float and engages the guide. Means connected to the guide selectively disengage the gripper member from the guide.

3 Claims, 4 Drawing Figures

PATENTED FEB 1 1972
3,638,492
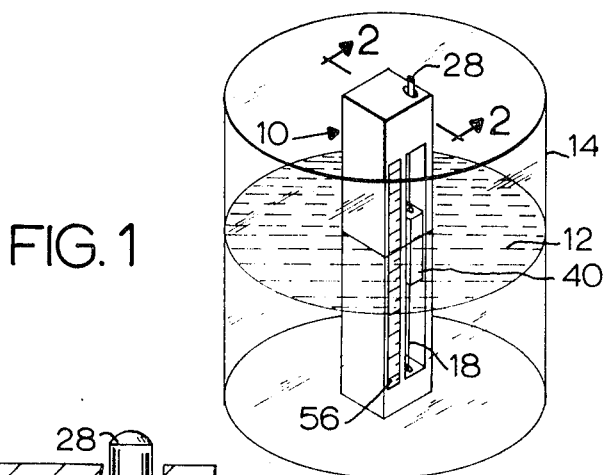
FIG. 1
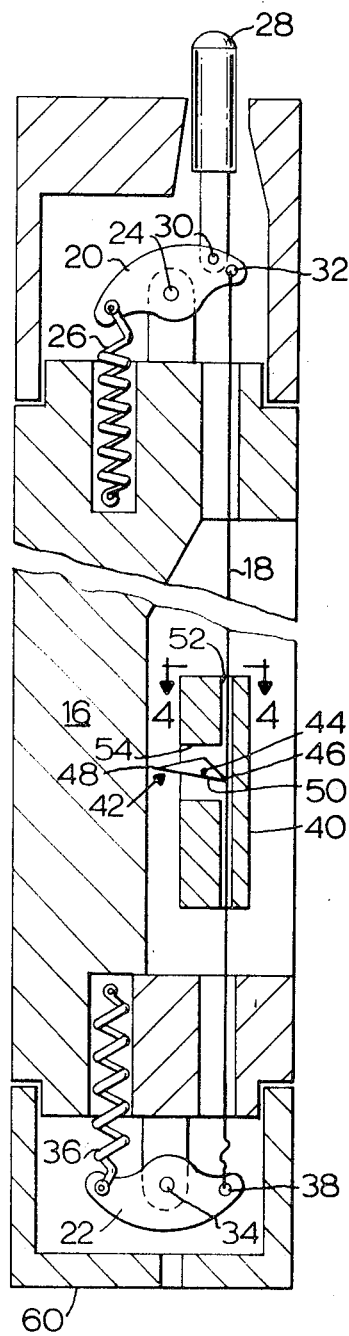
FIG. 2
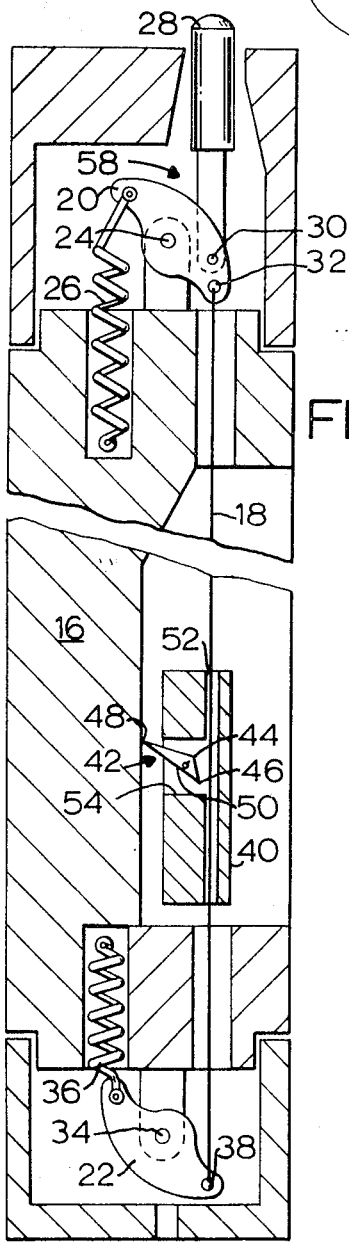
FIG. 3
FIG. 4
*INVENTOR.*
THOMAS A. FLING
WILLIAM F. FLING
BY
Robert Charles Hill
ATTORNEY

LIQUID LEVEL MEASURING DEVICE

BACKGROUND OF THE INVENTION

Field of the Invention

A liquid level measuring device is provided with a frame, a guide, a flat member and a gripper member mounted on the float to measure the exact level of the liquid within the container.

SUMMARY OF THE INVENTION

The obtaining of rapid and accurate measurements of liquids contained within vessels has been an industrial headache for a long time. The types of measuring devices on the market at the present time all have drawbacks of one sort or another. Measuring devices using the wetted line principle produce an accurate reading but cannot be reused until the measured liquid has dried from the measuring surface. The reel type of device is not in great demand because the winding up of the reel can be and often is quite cumbersome and time consuming. Many different float-type devices have been used in the past but the main problem with these devices is that they result in only a reasonably accurate reading, not an exact reading of the level of the liquid.

Applicants have overcome the above-described problems by providing a float-type measuring device which produces an exact reading of the liquid level.

It is the primary object of the present invention to provide a new and improved liquid level measuring device.

Another object is to provide a liquid level measuring device which gives an exact reading of the liquid level.

A further object of the invention is to provide structure of the character described which is economical to produce and long lasing in usage.

BRIEF DESCRIPTION OF THE DRAWINGS

FIG. 1 is a perspective view illustrating the liquid level measuring device of the present invention placed within a container.

FIG. 2 is a view taken substantially as indicated along line 2—2 of FIG. 1 and showing the gripper means engaging the guide.

FIG. 3 is a view similar to FIG. 2 but showing the gripper means disengaged from the guide.

FIG. 4 is a view taken substantially as indicated along line 4—4 of FIG. 2.

DESCRIPTION OF THE PREFERRED EMBODIMENT

Referring to FIG. 1 of the drawing, there is shown the liquid level measuring device of this invention, generally indicated 10, which is adaptable for use with many different liquids 12 and many different containers 14.

Looking particularly at FIGS. 2 and 3, there is shown a frame 16 having a guide 18 thereon which is intermediate upper member 20 and lower member 22. Upper member 20 is pivoted to frame 16 at 24 and is biased in an upward position by means of spring 26. Activating handle 28 extends above the top of the frame 16 and is secured to upper member 20 at 30 near aperture 32 through which guide 18 passes. Lower member 22 is pivoted to frame 16 at 34 and is maintained in a neutral position by spring 36. Guide 18 is connected to lower member 22 by means of aperture 38.

Buoyant float 40 is in near association with guide 18. Gripper member, generally indicated 42, is pivoted to float 40 by member 44 and has a contact edge 46, a release edge 48 and a bottom surface 50. Aperture 52 extending longitudinally through float 40 and slot portion 54 allow the gripper member 42 to freely engage the guide 18. Scale member 56 (FIG. 1) on frame 16 is calibrated to the geometry of the particular container 14 to give the desired reading. As will be described in detail hereinafter, the gripper member 42 engages the float 40 in the exact position on guide 18 when the device 10 is removed from the liquid 12. The gripper member 42 requires neither movement nor an external mechanism to engage the float 40 with the guide 18.

In actual operation, the liquid level measuring device of this invention is lowered into a liquid containing vessel until the lower end 60 of the frame 16 rests upon the bottom of the vessel. The float 40 will rise to the level of the liquid 12 within the container 14 but remain partially submerged due to its own weight. The weight-volume ratio of the float 40 is designed to cause the float to submerge to the level of the indicating line, thereby providing a precise measure of the liquid level. The upward forces, namely, the buoyancy of the float to rise freely and with little resistance since the buoyant force is large relative to the small gripping friction exerted on the guide 18.

Downward movement of the float is prevented by contact edge 46 which is always in contact with guide 18 except during the release operation. Because of the angle of contact of the contact edge 46 with guide 18 and as a result of the friction resulting from that contact, downward forces, namely, the weight of the float, cause the gripper member 42 to contact the guide 18 with increasing force, thus positively resisting downward movement. Thus, upon removal of the liquid level measuring device 10 from the liquid, the gripper member and therefore also the float will always retain the exact position they had when immersed. It has been found that an acceptable angle of contact occurs when the bottom surface 50 of the gripper member 42 is at an angle of from 3° to 15° above horizontal when the contact edge 46 engages the guide 18.

The release mechanism or disengaging means of the present invention maintains the guide 18 taut between upper member 20 and lower member 22 during measuring and also guide 18 and float 40 to move downward and inward toward frame 16 when activated. The disengaging means is activated by depressing activating handle 28. This causes spring 26 to elongate and permits upper member 20 to pivot or rotate clockwise as indicated by arrow 58 (FIG. 3). Clockwise movement causes the float 40 and guide 18 to move downward and inward toward frame 16 until release edge 48 contacts the frame 16 causing the gripper member 42 to rotate clockwise thereby moving the contact edge 46 away from guide 18 and causing the float 40 to descend to the bottom of the measuring device. When activating handle 28 is depressed, lower member 22 also rotates clockwise and spring 36 keeps guide 18 taut. Upon release of activating handle 28, spring 26, which is stronger than spring 36, brings all members back into measuring position as shown in FIG. 2.

Thus, it can be seen that means are provided which are connected to the guide 18 for selectively disengaging the gripper member 42 from the guide 18. In addition, the operation of the gripper member 42 on guide 18 is such that neither movement nor an external mechanism is required to secure the float 40 in the position which measures the exact level of the liquid.

We claim:

1. A liquid level measuring device for a container, comprising:
   a. a frame insertable in said container;
   b. a guide in said frame;
   c. a buoyant float surrounding said guide;
   d. a gripper member pivoted on said float and having a contact edge, a release edge, and a bottom surface, said gripper member freely movable during upward motion of the float relative to the guide;
   e. said contact edge constantly engaging said guide when said bottom surface is at the angle of from 3 to 15 degrees above horizontal;
   f. and means connected to said guide for selectively disengaging said gripper member from said guide.

2. A liquid level measuring device for a container, comprising:
   a. a frame;
   a guide in said frame;
   c. a buoyant float surrounding said guide;

d. a gripper member mounted on said float and adapted to freely move along the guide during upward motion of said float relative to said guide and to grip the guide upon downward movement of said float; and e. disengaging means connected to said guide for selectively disengaging said gripper member from said guide by moving said guide downward and inward toward said frame until said gripper member contacts said frame thereby disengaging said float from said guide.

3. The liquid level measuring device of claim 2 wherein the disengaging means includes an upper movable member mounted on said frame and connected to said guide, a lower movable member mounted on said frame and connected to said guide, and an activating handle secured to one of said members.

* * * * *